United States Patent [19]

Robinson

[11] Patent Number: 4,979,720
[45] Date of Patent: Dec. 25, 1990

[54] INJECTION MOLD HAVING INTERCHANGEABLE INSCRIPTION PLATES

[76] Inventor: Jeffrey Robinson, 3435 Caribeth Dr., Encino, Calif. 91436

[21] Appl. No.: 414,614

[22] Filed: Sep. 26, 1989

Related U.S. Application Data

[63] Continuation of Ser. No. 126,783, Nov. 30, 1987, abandoned.

[51] Int. Cl.$^5$ .................. B29C 33/30; A23G 1/22
[52] U.S. Cl. ...................... 249/103; 249/104; 249/144; 249/164; 249/184; 264/225; 425/192 R; 426/515
[58] Field of Search ............ 425/175, 190, 192 R, 425/193, 195, 577; 249/55, 98, 102-104, 112, 140, 144, 145, 155, 164, 184; 264/132, 225, 238, 328.1, 334; 426/87, 93, 104, 249, 279, 383, 515, 631, 660

[56] References Cited

U.S. PATENT DOCUMENTS

| | | |
|---|---|---|
| 3,536,290 | 10/1970 | Terry .................................. 249/103 |
| 3,883,109 | 5/1975 | Hahne .................................. 249/134 |
| 4,200,658 | 4/1980 | Katzman et al. ..................... 426/515 |
| 4,254,933 | 3/1981 | Netto .................................. 249/103 |
| 4,384,702 | 5/1983 | Boskovic ............................. 249/103 |
| 4,708,314 | 11/1987 | Kühling .............................. 249/103 |
| 4,778,683 | 10/1988 | Newsteder .......................... 426/515 |

FOREIGN PATENT DOCUMENTS

| | | | |
|---|---|---|---|
| 268291 | 5/1988 | European Pat. Off. | ........ 425/192 R |
| 2914281 | 10/1980 | Fed. Rep. of Germany | ...... 426/515 |

OTHER PUBLICATIONS

Neiman-Marcus Christmas Book, 1978, p. 1, Confectionery Monopoly Set.

Primary Examiner—James C. Housel

[57] ABSTRACT

A mold for forming a synthetic resin tray to be used in molding chocolate bars comprises a female mold portion defining a mold cavity and a male mold portion including a skirt projecting into the cavity. A plate is disposed in the male mold portion and engages an inwardly extending lip at the free end of the skirt. The plate is provided on a side facing the mold cavity with an inscription and is pressed against the lip by a pressure block disposed in the male mold portion. The pressure block is shiftable to enable a substitution of another inscription plate. The inscription plate may be provided with a projection on the inscription side for forming an opening or a recess in the injection molded tray.

14 Claims, 6 Drawing Sheets

INJECTION MOLD HAVING INTERCHANGEABLE INSCRIPTION PLATES

This application is a continuation of application Ser. No. 07/126,783, filed Nov. 30, 1987, now abandoned.

BACKGROUND OF THE INVENTION

This invention relates to a method and an injection molding apparatus for manufacturing a tray or mold utilizable for imprinting moldable foodstuffs. In addition, this invention relates to the tray or mold and an associated method for further imprinting or personalizing individual molded products within a series.

Significant consumer appeal may be imparted to chocolate bars, candy bars and other foodstuffs by imprinting thereon personalized messages which may be unique to the individual customer, to a group of customers or to the particular producer. Candy bars and the like imprinted with trademark logos or advertising slogans may be used effectively for advertising and marketing purposes. For example, a company having different classes of customers may wish to send, for promotional purposes, to the members of each class a chocolate bar bearing an imprinted message unique to the respective class.

Conventional molds for producing chocolate items are produced in one of three ways. Pursuant to a first technique, particularly utilized in the production of bite-size chocolate pieces such as truffles and filled candies, or of mass produced candy bars, each piece or bar is formed in a precision mold intended for a single item only. Tooling is accordingly implemented on a one-design use basis only. If any changes are to be made in the details of the chocolate pieces or bars, new molds must be made.

Pursuant to another conventional technique for manufacturing molds to be utilized in the production of chocolate pieces, exemplarily chocolate bars having design elements but not intended for mass production, the chocolate molds are vacuum formed from a sheet of thin thermoplastic material heated and sucked down over a pre-cut wooden form. Although such a technique is inexpensive, it is incapable of producing a high degree of detail in the inscribed shapes.

A third conventional technique for manufacturing molds to be utilized in the production of chocolate pieces involves molding with silicone, as described in U.S. Pat. No. 4,200,658 to Katzman et al. This method of forming chocolate pieces or bars is slow and cumbersome inasmuch as it takes hours or days for a silicone mold to cure. The use of silicone molds is especially ill adapted for applications in which the form of the mold must be frequently and rapidly changed.

OBJECTS OF THE INVENTION

An object of the present invention is to provide a method and apparatus for producing a mold or tray having an inscription to be imprinted on a moldable food stuff, wherein trays having different inscriptions can be easily produced.

A more particular object of the present invention is to provide an injection molding method and apparatus for producing a tray of the above-described type wherein the inscription can be changed without requiring a complete retooling of the injection mold.

Another object of the present invention is to provide a tray or mold for forming moldable foodstuffs into a shape having an inscription which is easily changeable.

Yet another object of the present invention is to provide such a mold or tray capable of imparting accurate and detailed imprints to moldable foodstuffs.

Another object of the present invention is to provide a method for mass producing foodstuffs imprinted with personalized messages Another, more particular, object of the present invention is to provide such a method for mass producing foodstuffs, wherein the personalized foodstuffs are produced efficiently and economically.

SUMMARY OF THE INVENTION

A mold utilizable with an extruder for forming a synthetic resin tray by injection molding comprises, in accordance with the present invention, a female mold portion, a male mold portion, and a plate disposed in the male mold portion. The female mold portion defines a mold cavity, while the male mold portion includes a skirt projecting into the cavity and spaced from inner surfaces of the female mold portion. The skirt is provided at a free end with an inwardly extending lip defining an opening at the free end of the skirt. The plate is disposed at the free end of the skirt and engages the lip thereon. The plate is provided on a side facing the mold cavity with an inscription and is pressed against the lip by a pressure member engaging the plate on a side thereof opposite the mold cavity, whereby a substantially fluid tight seal is formed between the plate and the lip. The pressure member is disposed at least partially in the male mold portion, while access is provided on the male mold portion for facilitating removal and replacement of the inscribed plate.

Pursuant to two further features of the present invention, the pressure member has a face in engagement with the plate along a peripheral edge thereof and takes the form of a block substantially co-extensive with the plate. The block is shiftable between a pressure position and a disengaged position.

The access on the male mold portion is provided by a cover on the male mold portion and means for locking the cover to the male mold portion. The cover and the male mold portion advantageously comprise respective halves of a mold member attached to the female mold portion A clamp such as a bolt element may be provided in the cover for locking or fastening the pressure block to the cover.

Pursuant to yet another feature of the present invention, the inscribed plate is provided on the side thereof facing the mold cavity with means such as a projection for forming an opening in the bottom wall of the tray produced upon injection of hardenable synthetic resin material into the mold cavity. Alternatively, or in addition, the plate may be provided on the side thereof facing the mold cavity with a projection for forming a recess in the bottom wall of the injection molded tray. Such a recess may receive moldable foodstuff of a composition or color different from the composition or color of moldable foodstuff poured in a liquid state in the remainder of the tray.

A method for producing a pair of synthetic resin trays each having a bottom wall provided with a different inscription comprises, in accordance with the present invention, the steps of: (a) providing a mold having a female mold portion defining a mold cavity and a male mold portion including a skirt projecting into the mold cavity, the skirt being spaced from the inner surfaces of the female mold portion and provided at a free end with an inwardly extending lip defining an opening at the free end of the skirt, (b) pressing a first plate disposed in the male mold portion at the free end of the skirt against the lip to form a substantially fluid tight seal between the plate and the lip, the plate being provided on a side facing the mold cavity with a first inscription, and (c) injecting a hardenable synthetic resin material into the mold cavity. Further steps in the method in accordance with the present invention for producing two trays having different inscriptions in their bottom walls include: (d) allowing the injected synthetic resin material to harden to form a first tray having a bottom wall provided with an inversion of the first inscription, (e) opening the mold, (f) ejecting the first tray, (g) releasing pressure on the first plate, (h) removing the first plate from the male mold portion, (i) inserting a second plate into the male mold portion, and (j) pressing the second plate against the lip to form a substantially fluid tight seal between the second plate and the lip. The second plate is provided on a side facing the cavity with a second inscription. Further steps include: (k) closing the mold upon the insertion of the second plate, (l) injecting additional hardenable synthetic resin material into the mold cavity, (m) allowing the injected additional synthetic resin material to harden to form a second tray having a bottom wall provided with an inversion of the second inscription, (n) opening the mold and (o) ejecting the second tray.

A molding assembly for producing a pair of edible bars each having a major surface provided with a different inscription comprises, in accordance with the present invention, a molding tray having a main inscription on a bottom inside surface and formed therein with an aperture, a first plate having a first additional inscription on one side and dimensions substantially equal to dimensions of the aperture in the molding tray, and a second plate having a second additional inscription on one side and dimensions substantially equal to the dimensions of the aperture. An attachment device is provided for releasably fastening the first plate and alternately the second plate to the tray on an outer side thereof opposite the bottom inside surface of the tray. A substantially fluid tight seal is formed between the first plate and the bottom inside surface of the tray and, alternately, between the second plate and the bottom tray surface.

A related method for producing a pair of edible bars each having a major surface provided with a different inscription comprises, in accordance with the present invention, the steps of: (a) providing a molding tray having an inscription on a bottom inside surface and formed therein with an aperture, (b) providing a first plate having on one side a first additional inscription and dimensions substantially equal to dimensions of the aperture, (c) disposing the first plate in the aperture so that the additional inscription faces into the tray, (d) releasably fastening the plate to the tray on an outer side thereof opposite the bottom inside surface, and (e) pouring hardenable liquid food and material into the tray. Upon allowing the food material to harden to form a first edible bar with a first composite inscription including an inversion of the main inscription and an inversion of the first additional inscription, the first edible bar is removed from the tray and the first plate is removed from the aperture in the bottom of the tray. A second plate having on one side a second additional inscription and dimensions substantially equal to dimensions of the aperture is disposed in the aperture so that the additional inscription faces into the tray. The second plate is releasably fastened to the tray on an outer side thereof opposite the bottom inside surface of the tray. Additional hardenable liquid food material is then poured into the tray and allowed to harden to form a second edible bar with a second composite inscription including an inversion of the main inscription and an inversion of the second additional inscription.

A tray or molding assembly in accordance with the instant invention includes an inscription member which is easily changeable and easily removable from the tray. Foodstuffs with temperature-dependent flow characteristics suitable for use in accordance with the invention include, without limitation, chocolates, caramels, and other candies and foods which become pourable when heated, but which cool to form substantially solid bodies.

DETAILED DESCRIPTION

In accordance with the present invention, foodstuffs having temperature-dependent flow characteristics are personalized by pouring the foodstuff to be imprinted into a mold, prepared in accordance with the invention, at a time when the temperature of the foodstuff is high enough to allow pourability. Following introduction of the foodstuff into the mold and, optionally, closing the mold, the foodstuff is allowed to cool and harden. Foodstuffs particularly useful for this process, include, without limitation, chocolate, milk chocolate, butterscotch, toffies, and other candies and foods on which it is desirable to imprint personalized messages. As a particular example, chocolate candy bars having personalized messages may be formed in molds which are injection molded and formed pursuant to particular features of the present invention.

Figure 1:
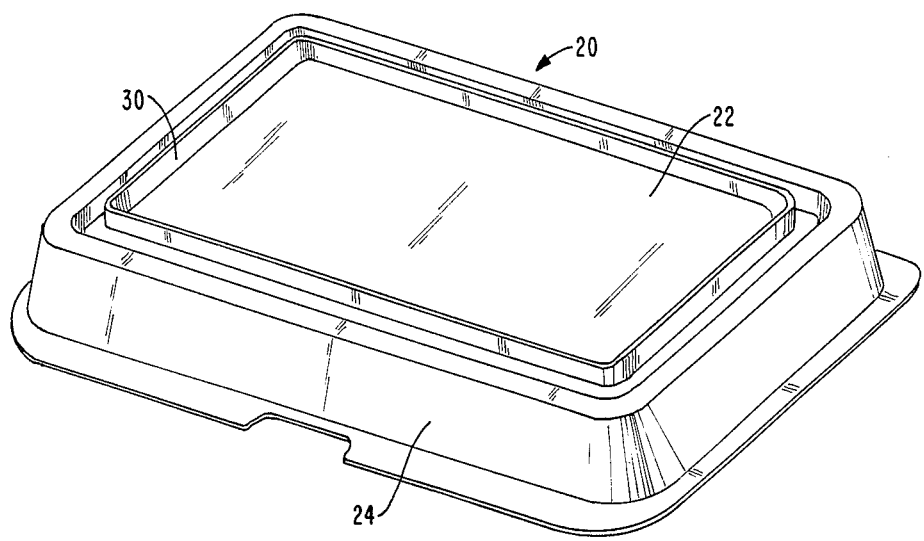
FIG. 1 is an isometric view of bottom side of a molding tray made in accordance with the present invention.
Figure 2:
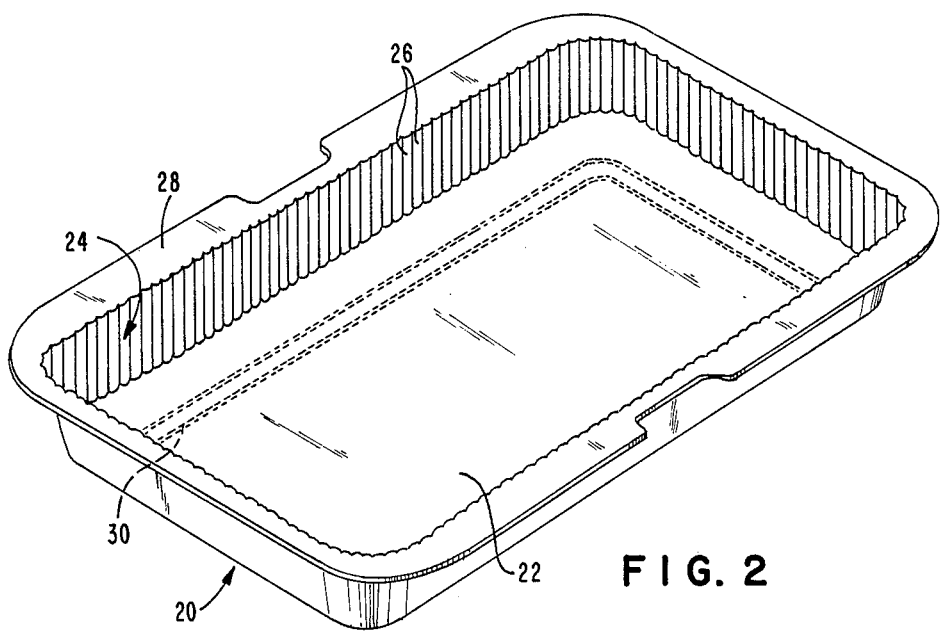
FIG. 2 is an isometric view of the inner side of the molding tray of FIG. 1.
Figure 3:
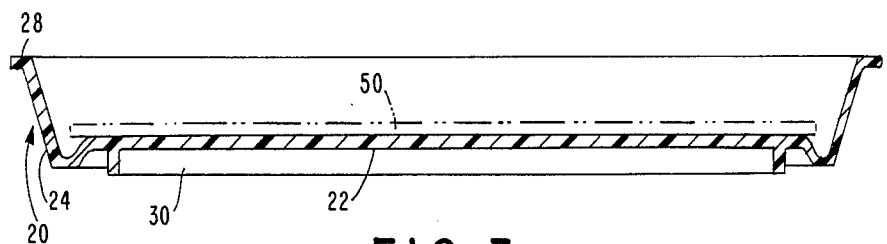
FIG. 3 is a longitudinal cross-sectional view of the molding tray of FIGS. 1 and 2.

As illustrated in FIGS. 1, 2 and 3, a tray 20 for molding a chocolate bar is a unitary piece of injection molded synthetic resin material including a bottom wall 22 and a parametrically extending side wall 24. As shown in FIG. 2 (but not in the other drawing figures for purposes of clarity), side wall 24 may be provided on an inner side with a plurality of linear ribs 26 contiguous with one another and extending substantially perpendicularly with respect to bottom wall 22. At a free end, side wall 24 is further provided with an outwardly extending lip or rim 28.

Figure 4:
FIG. 4 is a plan view of a bottom inside surface of the tray of FIGS. 1-3, showing a sample inscription made in accordance with the present invention.

On an outer side, bottom wall 22 is provided with a parametrically extending bead or ridge 30, while on an inner side or surface the bottom wall is formed with an inscription (not illustrated in FIGS. 2 and 3, for purposes of clarity) transferable to a bar of chocolate of other moldable foodstuff in inverted form. FIG. 4 illustrates an example of an inscription which can be provided on a chocolate bar in accordance with the steps and apparatus of the present invention and which is provided in inverted form on the inner surface of bottom wall 22.

Figure 5:
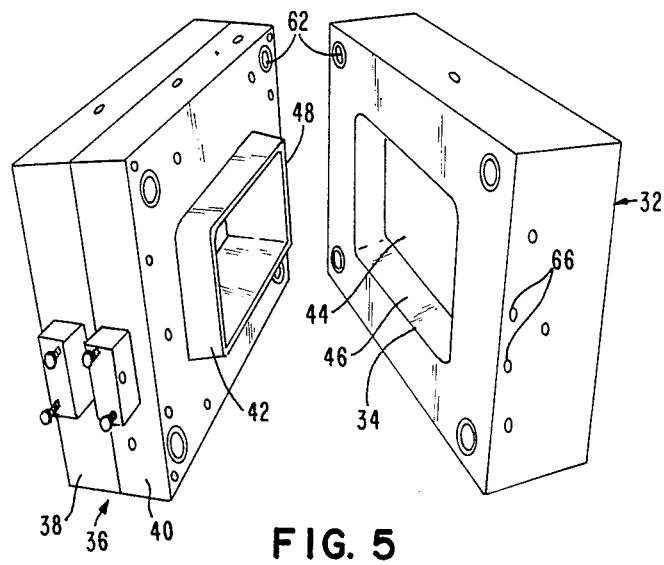
FIG. 5 is a perspective view of an injection mold for forming the molding tray of FIGS. 1-4.
Figure 6:
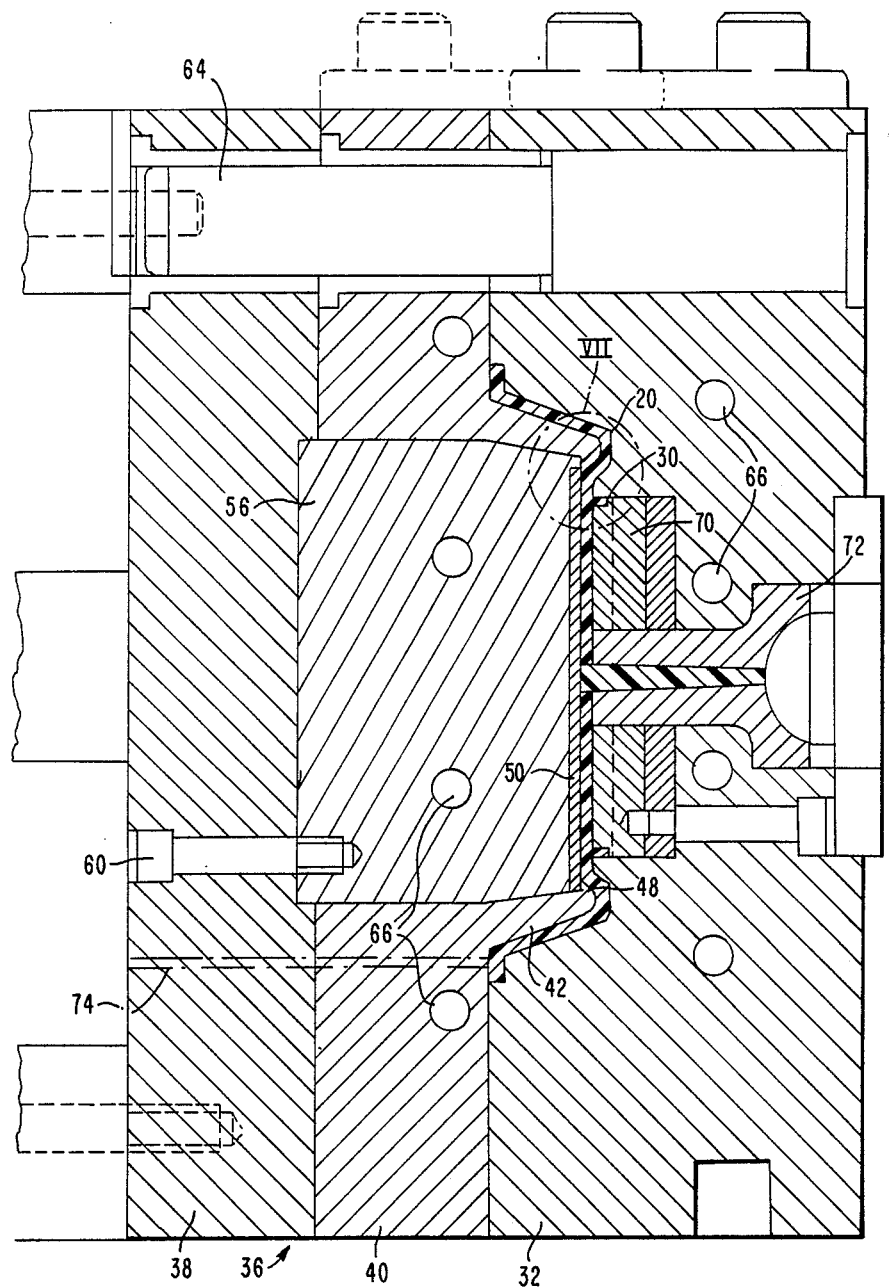
FIG. 6 is a vertical cross-sectional view of the mold of FIG. 5 in an assembled condition, showing the molding tray of FIGS. 1-3 in cross-section and on a reduced scale.

As illustrated in FIGS. 5 and 6, a mold utilizable with an extruder for forming synthetic resin tray 20 by injection molding comprises, in accordance with the present invention, a female mold portion 32 defining a mold cavity 34 and a male mold portion 36 including two mold halves 38 and 40.

Male mold portion 36, and particularly mold half 40, carries a skirt 42 which in the assembled state of the mold (FIG. 6), projects into mold cavity 34. Skirt 42 is spaced from inner surfaces 44 and 46 of female mold portion 32. Inner surfaces 44 and 46 define cavity 34. Skirt 42 is provided at a free end with an inwardly extending lip 48 which defines a substantially rectangular opening at the free end of skirt 42.

Figure 7:
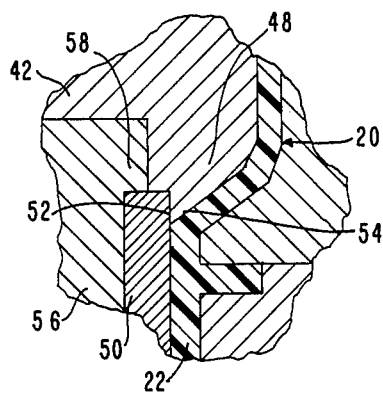
FIG. 7 is a detailed view taken from the region VII in FIG. 6.

As illustrated in FIG. 6, a preferably magnesium plate 50 bearing an inscription or a personalized message having variation and detail similar to that illustrated in the sample inscription of FIG. 4 is disposed in male mold half 40 at the free end of skirt 42. The inscription on plate 50 faces into mold cavity 34 in the assembled state of the mold shown in FIG. 6. As illustrated in detail in FIG. 7, an edge region 52 of plate 50 engages a shoulder 54 provided on lip 48. Shoulder 54 defines an angular recess on an inner side of lip 48, plate 50 being seated in that recess.

Male mold portion 36 includes a pressure block 56 which engages plate 50 on a side thereof opposite mold cavity 34 for pressing plate 50 against shoulder 54 of lip 48 to form a substantially fluid tight seal between the plate and the lip. As illustrated in FIG. 6, pressure block 56 is mostly located within male mold half 40 and projects partially into male mold half 38. Pressure block 56 is at least coextensive with plate 50 and, in the illustrated embodiment, includes a rim 58 (FIG. 7) defining a rectangular recess receiving plate 50.

Pressure block 56 is clamped to plate 50 and lip 48 upon the locking of male mold halves at 38 and 40 to one another. As illustrated in FIG. 6, mold halve 38 may be provided with one or more bolts 60 for attaching pressure block 56 to mold half 38. Upon a separation of mold halves 38 and 40 pursuant to conventional techniques, pressure block 56 slides out of mold half 40 to enable a replacement of plate 50 by another plate (not illustrated) having exactly the same dimensions and a different inscription on one face thereof.

Mold portions 32 and 36 are provided with alignable bores 62 (FIG. 5) traversed by support shafts 64 (FIG. 6) in a manner well known in the art. Mold halves 32 and 36 are also provided with conduits 66 through which cooling fluid flows during an injection molding operation.

Female mold portion 32 may be provided with an interchangeable mold part 70 for varying the configuration of bottom wall 22. For example, the size and location of ridge 30 may be altered by replacing mold part or insert 70 with another mold part having a different structure. As is well known in the art, female mold portion 32 is also provided with an injection nozzle part 72 through which liquefied synthetic resin material is injected into mold cavity 34 to form molding tray 20.

Upon the injection of hardenable synthetic resin material into mold cavity 34 and upon the hardening of the injected synthetic resin material to from tray 20, mold portions 32 and 36 are separated from one another to open the mold. An ejector mechanism 74 indicated in FIG. 6 in dot-dash lines is then actuated to eject the tray 20 from skirt 42. Male mold halves 38 and 40 are separated from one another and pressure block 56 is removed from mold half 40, whereupon inscription plate 50 is replaced by another plate having a different inscription. Upon the insertion of block 56 into mold half 40 and skirt 42 and the locking of mold halves 38 and 40 to one another so that pressure block 56 presses against the new plate 50 to clamp that plate against lip 48, the mold is closed and hardenable synthetic resin material is injected into mold cavity 34 to form a tray having an inscription which is the reverse or inverted counter-part of the inscription on the newly inserted plate 50.

Each inscription plate 50 is preferably used to form a relatively limited number of molding trays 20. Upon the completion of such a production run, the inscription plate 50 is interchanged with another plate and another run can be commenced. Generally, the plate changing operation need take no longer then five minutes. Clearly, a number of trays having different inscriptions may be produced at low cost and high efficiency, without the need for completely retooling the injection mold.

Figure 8:
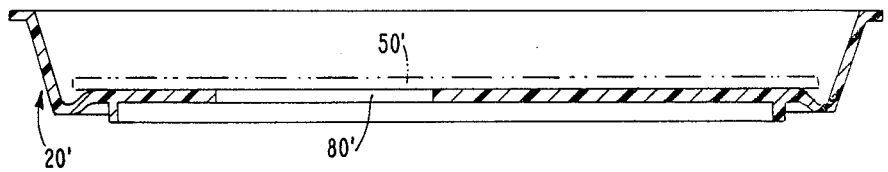
FIG. 8 is a longitudinal cross-sectional view of another molding tray in accordance with the present invention.

As depicted in FIG. 8, a molding tray 20' in accordance with the present invention may be provided with an opening 80' formed during the injection molding process by a projection on the inscribed face of a plate 50', the projection having a thickness equal to the depth or breadth of mold cavity 34 upon the closure of the mold.

Figure 9:
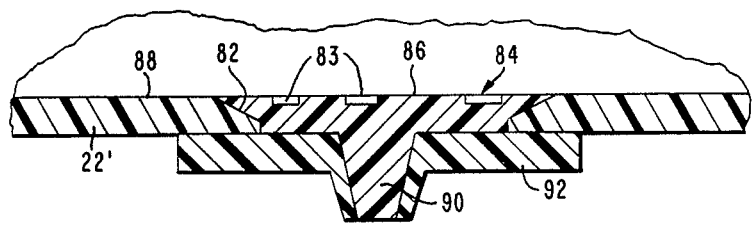
FIG. 9 is a partial cross-sectional view of a bottom wall of a modified molding tray in accordance with the present invention, showing a plate insert in an opening in the bottom wall.

As illustrated in FIG. 9, an opening in a bottom wall 22' of a mold tray in accordance with the instant invention preferably has bevelled edges or side surfaces 82 engagable in a form fitting manner with similarly inclined edges or surfaces at the periphery of a plate insert 84. Plate insert 84 or other such inserts may carry an inscription or a personalized message 83 on a side 86 facing into the interior of the tray. The message may, for example, include the name of an individual in a group of individuals to which personalized chocolate bars are to be sent. As described hereinabove, an inside surface 88 of bottom wall 22' is provided with an inscription common to all the chocolate bars sent to members of the group of individuals. Each plate insert 84 is releasably attached or fastened to the bottom wall 22' of the molding tray on an outer side thereof opposite bottom inside surface 88. To releasably fasten a plate insert 84 to bottom wall 22' in the opening provided therein, insert 84 is exemplarily provided on one side with a frusto-conical central post 90. Post 90 is attached in a form-lock or friction fit to a resilient clip 92 which bridges the opening in bottom wall 22' and securely holds plate insert 84 inside the opening. To change the personalized subscription plate 84, resilient clip 92 is detached from plate insert 84, exemplarily by breaking post 90. Another inscription or name plate can then be installed.

Figure 10:
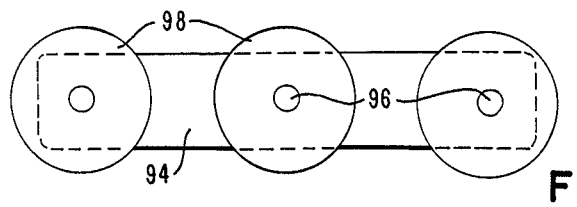
FIG. 10 is a plan view of a plate insert together with holding clips for fastening the insert to a molding tray in accordance with the present invention.

As illustrated in FIG. 10, an inscription plate 94 for insertion into an opening or aperture in the bottom wall of a chocolate molding tray in accordance with the present invention may take an elongate form and be provided with a plurality of posts 96 for attachment to respective resilient clips 98.

Figure 11:
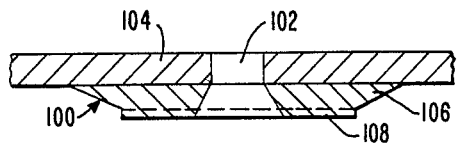
FIG. 11 is a partial cross-sectional view of an inscription plate with a projection for forming an opening in a bottom wall of a injection molded molding tray in accordance with the invention.

As depicted in FIG. 11, the opening in bottom wall 22' (FIG. 9) is advantageously formed by a projection 100 attached via a bolt 102 to an inscription plate 104 insertable in male mold portion 36 (FIG. 6) as a substitute for plate 50. Projection 100 includes a frusto-conical portion 106 and a thin cylindrical portion 108. For purposes of enhancing the seal between plate insert 84 (FIG. 9) and bottom wall 22', the angle of inclination of the outer surface of frusto-conical portion 106 with respect to the plane of inscription plate 104 is less than the corresponding angle of inclination of the beveled edge of plate insert 84. The resulting difference in inclination of surface 82 (FIG. 9) and the beveled surface of plate insert 84 serves to center plate insert 84 and to enhance the seal around the edge thereof with a slight deflection of the periphery of insert 84 during installation.

It is to be noted that the use of flat head screws (e.g., 102) to attach a projection (e.g., 106) to an inscription plate in accordance with the present invention enables the deposition of an increased amount of plastic in the areas of the screw heads, which facilitates removal of residual plastic film known as "flash." Upon the removal of a major portion of the flash associated with an opening in the bottom wall (e.g., 22') of a chocolate molding tray in accordance with the present invention, traces of the flash adhering to the sides of the opening may be removed by a scraping procedure. It is to be further noted that a projection (106) on the inscribed face of an inscription plate (104) may require bonding by epoxy or other adhesive to achieve adequate sealing.

Figure 12:
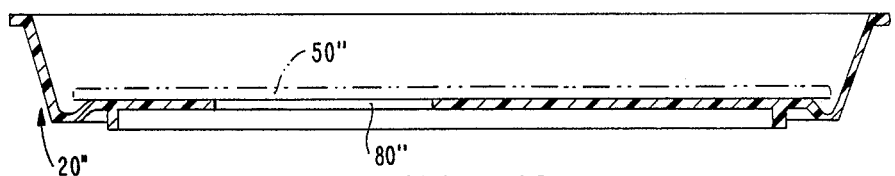
FIG. 12 is a longitudinal cross-sectional view of yet another molding tray in accordance with the present invention.

As shown in FIG. 12, a molding tray 20" pursuant to the instant invention may be provided with a recess 80" for receiving moldable foodstuff of a different texture or color to provide a decorative contrast with the remainder of a molded chocolate bar or other molded form of edible foodstuff. Recess 80" is formed by a projection on the inscribed surface of a plate 50", the projection having a thickness less than the breadth of mold cavity 34. The projection for forming recess 80" may be attached to plate 50" by epoxy or other adhesive. Insofar as the surface of molding tray 20" at recess 80" must be smooth, attachment elements such as bolts are inappropriate.

Figure 13:
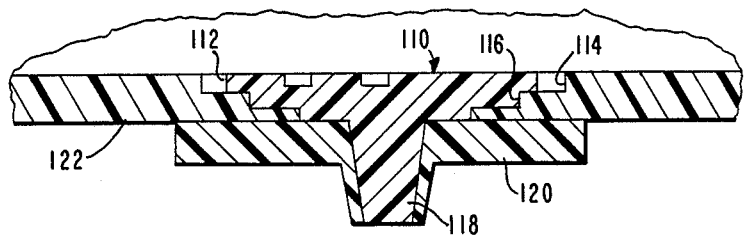
FIG. 13 is a partial cross-sectional view of a bottom wall of another modified molding tray in accordance with the present invention, showing another form of a plate insert in an opening in the bottom wall of a molding tray.

As illustrated in FIG. 13, a plate insert 110 pursuant to the instant invention may be provided along a circumference with a stepped configuration for mating with a stepped configuration defining an opening 112 in a bottom wall 122 of a chocolate molding tray. A continuous bezel 114 is formed around plate insert 110 and takes the form of a shoulder. A second step 116 in the stepped configuration of opening 112 preferably terminates at points spaced from the ends of plate insert 110. Step 116 serves to center plate insert 110 in aperture 112 and in an engraving machine. Step 116 does not extend to the ends of slot or aperture 112 so that if there is a tolerance problem the large mold can be deflected outwardly to allow insertion. If step 116 continued to the end, the mold would be too stiff to deflect. Plate insert 110 is provided with a post 118 attachable to a resilient clip 120 in a snap-lock or friction fit.

Figure 14:
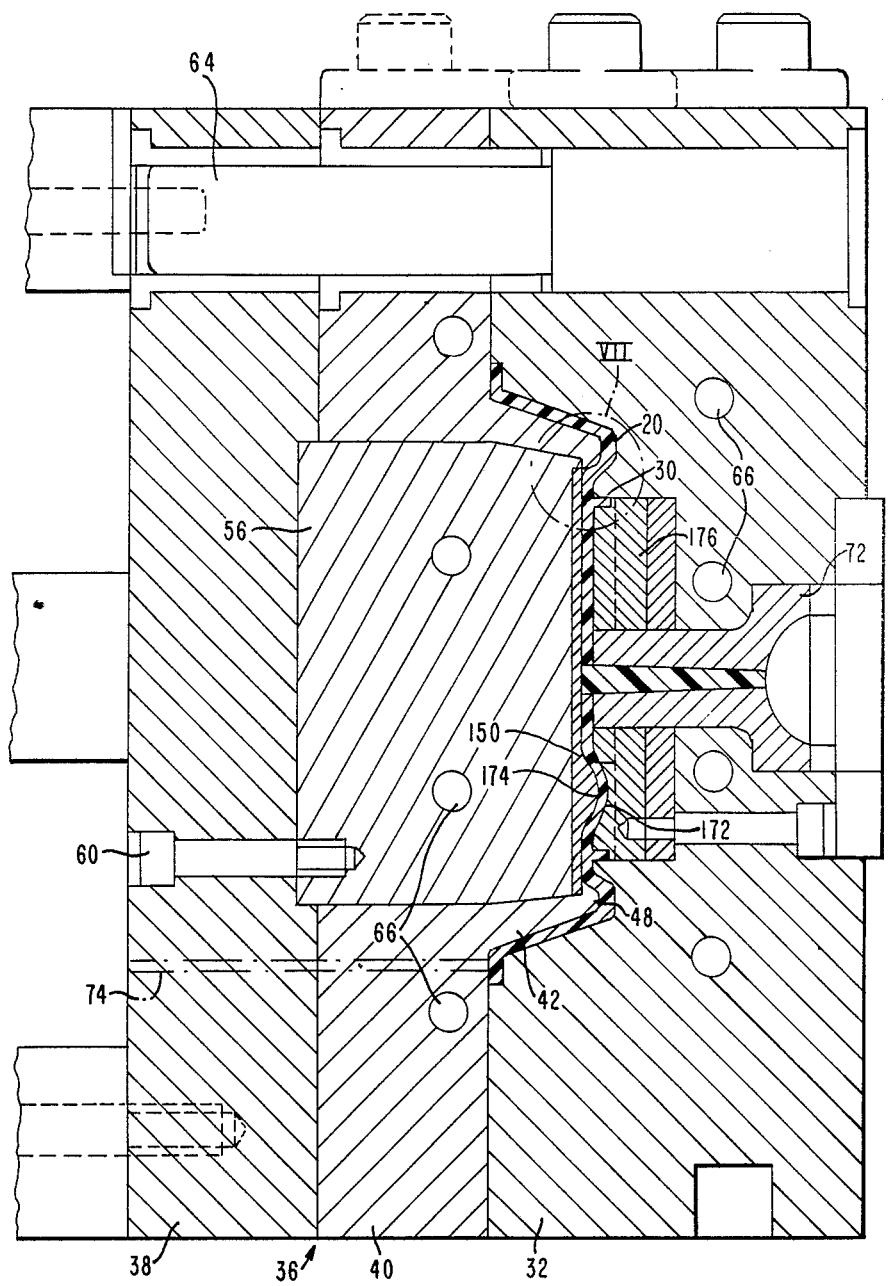
FIG. 14 is a vertical cross-sectional view largely identical to FIG. 6, showing a feature of the invention for forming ornaments on an edible bar in accordance with the present invention.

FIG. 14 illustrates a particular feature of the present invention, wherein an aluminum mold part 170 corresponding to mold part 70 in FIG. 6 is provided with a hollowed-out portion 172 into which a projection 174 on an inscription plate 150 protrudes. The feature of the invention illustrated in FIG. 14 enables the molding of a synthetic resin tray 176 having a substantial depression for receiving differently colored chocolate or other liquefied hardenable food material to form an ornament or decoration on the surface of a chocolate bar molded in tray 176. Of course, the exact details of the ornament will be determined by the details of projection 174. It is to be noted that hollowed out portion 172 should not extend beyond the rim of ridge 30.

Although the invention has been described in terms of particular embodiments and applications, one of ordinary skill in the art, in light of this teaching, can generate additional embodiments and modifications without departing from the spirit of or exceeding the scope of the claimed invention. Accordingly, it is to be understood that the descriptions and illustrations herein are preferred by way of example to facilitate comprehension of the invention and should not be construed to limit the scope thereof.

What is claimed is

1. A mold utilizable with an extruder for forming a synthetic resin tray by injection molding, said mold comprising in combination:
   a female mold portion defining a mold cavity;
   a male mold portion including a skirt projecting into said cavity, said skirt being spaced from inner surfaces of said female mold portion, said skirt being provided at a free end with an inwardly extending lip, said lip defining an opening at said free end;
   a plate removably disposed in said male mold portion within said skirt, said plate engaging said lip, said plate being provided on a side facing said cavity with an inscription means for imprinting an inscription to an injected synthetic resin;
   pressure means engaging said plate on a side thereof opposite said cavity for pressing said plate against said lip to form a substantially fluid tight seal between said plate and said lip, said pressure means being disposed at least partially in said male mold portion; and
   access means provided on said male mold portion for facilitating removal and replacement of said plate.

2. The mold defined in claim 1 wherein said pressure means includes a pressure member having a face in engagement with said plate along a peripheral edge thereof.

3. The mold defined in claim 2 wherein said pressure member takes the form of a block and wherein said face is coextensive with said plate and engages said plate substantially along the entire extent thereof.

4. The mold defined in claim 3 wherein said block is shiftable between a pressure position and a disengaged position.

5. The mold defined in claim 3 wherein said access means includes a cover on said male mold portion and means for locking said cover to said male mold portion.

6. The mold defined in claim 5 wherein said cover and said male mold portion comprise respective halves of a mold member attached to said female mold portion.

7. The mold defined in claim 6, further comprising clamping means engageable with said block for clamping said block to said plate.

8. The mold defined in claim 7 wherein said clamping means includes a bolt element.

9. The mold defined in claim 7 wherein said plate is provided on the side thereof facing said cavity with means for forming an opening in a bottom wall of the tray produced by injecting hardenable synthetic resin material into said cavity, said means for forming comprising a projection on the side of said plate facing said cavity.

10. The mold defined in claim 7 wherein said plate is provided on the side thereof facing said cavity with means for forming a recess in a bottom wall of the tray produced by injecting hardenable synthetic resin material into said cavity, said means for forming comprising a projection on the side of said plate facing said cavity.

11. The mold defined in claim 1 wherein said access means includes a cover on said male mold portion and means for locking said cover to said male mold portion.

12. The mold defined in claim 1 wherein said pressure means includes a pressure block, said mold further comprising clamping means engageable with said block for clamping said block to said plate.

13. The mold defined in claim 1 wherein said plate is provided on the side thereof facing said cavity with means for forming an opening in a bottom wall of the tray produced by injecting hardenable synthetic resin material into said cavity, said means for forming comprising a projection on the side of said plate facing said cavity.

14. The mold defined in claim 1 wherein said plate is provided on the side thereof facing said cavity with means for forming a recess in a bottom wall of the tray produced by injecting hardenable synthetic resin material into said cavity, said means for forming comprising a projection on the side of said plate facing said cavity.

* * * * *